United States Patent
Arakawa et al.

(10) Patent No.: US 11,345,171 B2
(45) Date of Patent: May 31, 2022

(54) IMAGE RECORDING APPARATUS

(71) Applicant: Brother Kogyo Kabushiki Kaisha, Nagoya (JP)

(72) Inventors: Yuta Arakawa, Nagoya (JP); Gakuro Kanazawa, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/208,061

(22) Filed: Mar. 22, 2021

(65) Prior Publication Data

US 2021/0379910 A1     Dec. 9, 2021

(30) Foreign Application Priority Data

Jun. 4, 2020   (JP) .............................. JP2020-097968

(51) Int. Cl.
| | | |
|---|---|---|
| *B41J 11/42* | (2006.01) | |
| *B65H 3/06* | (2006.01) | |
| *B65H 5/06* | (2006.01) | |
| *H02P 7/06* | (2006.01) | |
| *H04N 1/32* | (2006.01) | |

(52) U.S. Cl.
CPC ............ *B41J 11/42* (2013.01); *B65H 3/0669* (2013.01); *B65H 5/06* (2013.01); *H02P 7/06* (2013.01); *H04N 1/32448* (2013.01)

(58) Field of Classification Search
CPC .......... B41J 11/42; B65H 3/0669; B65H 5/06; H02P 7/06; H04N 1/32448
See application file for complete search history.

(56) References Cited

U.S. PATENT DOCUMENTS

2005/0169681 A1\* 8/2005 Hata .................... G03G 15/602
399/367

FOREIGN PATENT DOCUMENTS

| JP | H08-267864 A | | 10/1996 | |
|---|---|---|---|---|
| JP | 2007-168976 A | | 7/2007 | |
| JP | 2007168976 A | \* | 7/2007 | ............... B65H 5/06 |
| JP | 2012020873 A | \* | 2/2012 | ............. B65H 29/58 |
| JP | 2013-078245 A | | 4/2013 | |

\* cited by examiner

*Primary Examiner* — Yaovi M Ameh
(74) *Attorney, Agent, or Firm* — Burr & Brown, PLLC

(57) ABSTRACT

An image recording apparatus having a recorder, a first driving device, a second driving device, a driving-force transmission device, a sensor, a memory, and a controller to conduct a conveying process and a recording process alternately and repetitively, is provided. In the conveying process, on condition that a rotationally driven amount of the first driving device exceeded a target rotation amount, the controller conducts feedback control on the first driving device to rotate reversely. On condition that the first driving device was rotationally driven reversely under the feedback control, the controller stores a maximum value and a stopping value in the memory, determines a correction value, and determines a post-correction rotation amount based on the target rotation amount and an amount corresponding to the correction value, and in the conveying process, the controller drives the first driving device rotationally by the post-correction rotation amount.

4 Claims, 12 Drawing Sheets

IMAGE RECORDING APPARATUS

CROSS REFERENCE TO RELATED APPLICATION

This application claims priority under 35 U.S.C. § 119 from Japanese Patent Application No. 2020-097968, filed on Jun. 4, 2020, the entire subject matter of which is incorporated herein by reference.

BACKGROUND

Technical Field

The present disclosure is related to an image recording apparatus capable of recording an image on a sheet.

Related Art

An image recording apparatus for recording images on a sheet is known. The sheet may be conveyed inside the image recording apparatus along a conveyer path. The image recording apparatus may have a plurality of driving devices to be driven by a motor. The driving devices may include, for example, rollers. The rollers may convey the sheet by rotation.

In view of recent demands for downsizing and cost reduction of image recording apparatuses, it is preferable that a quantity of motors mounted on an image recording apparatus is smaller. Therefore, it may be preferable that the plurality of driving devices provided in the image recording apparatus are driven by a common motor. An amount of movement of each driving device may be controlled by feedback control targeted at a predetermined target amount.

Meanwhile, for example, in a configuration, in which a driving force may be transmitted from the motor to the driving devices through a gear train, when the motor rotating in a normal direction is switched to rotate in a reverse direction, play corresponding to backlash may occur in the gear train. Thereafter, when the motor is switched to rotate in the normal direction again, a working amount of the driving devices may be reduced by the amount of play with respect to the rotation amount of the motor. In other words, a difference may be caused between the working amount of the driving devices and the rotation amount of the motor, and the working amount of the driving devices may be unsteady. In order to eliminate the unsteadiness of the working amount of the driving devices, which may be caused by switching the rotational directions of the motor, the rotation amount of the motor to be controlled may be corrected by adding an amount corresponding to the backlash.

SUMMARY

The rotation amount of the motor may be corrected based on estimated values based on an ideal profile; therefore, it may not necessarily reflect the amount of play that may occur in practice. As a result, the corrected rotation control of the motor may not finely overcome the unsteadiness of the working amount caused by the play amount, which occurs in practice.

The present disclosure is advantageous in that an image recording apparatus, in which play caused in a driving-force transmission assembly may be eliminated finely under feedback-control, is provided.

According to an aspect of the present disclosure, an image recording apparatus, having a recorder movable in a moving direction, a first driving device configured to be driven rotationally, a second driving device configured to convey a recordable medium in a conveying direction, which intersects with the moving direction, by rotating, a driving-force transmission device configured to drive a rotational driving force from the first driving device to the second driving device, a sensor configured to output a signal corresponding to a rotationally driven amount of the first driving device, a memory, and a controller configured to conduct a conveying process, in which the recordable medium is conveyed in the conveying direction by driving the first driving device rotationally by a target rotation amount in a first rotational direction and stopping rotation of the first driving device, and a recording process, in which a part of an image is recorded on the recordable medium by moving the recorder in the moving direction, alternately and repetitively to record the image on the recordable medium, is provided. In the conveying process, on condition that the controller determines the rotationally driven amount of the first driving device exceeded the target rotation amount based on the signal output from the sensor, the controller conducts feedback control targeted at the target rotation amount to drive the first driving device rotationally in a second rotational direction reversely from the first rotational direction, on condition that the controller determines that the first driving device was rotationally driven in the second rotational direction under the feedback control, the controller stores, based on the signal output from the sensor, a maximum value, which indicates a peak rotated amount of the first driving device in the first rotational direction in the conveying process, and a stopping value, which indicates a rotated amount of the first driving device when the rotation of the first driving device was stopped in the conveying process, in the memory, the controller determines a correction value, which is proportional to a value obtained by subtracting the stopping value from the maximum value, the controller determines a post-correction rotation amount based on the target rotation amount and an amount corresponding to the correction value for the conveying process to be conducted next after the recording process. In the conveying process conducted next after the recording process, the controller drives the first driving device rotationally by the post-correction rotation amount in the first rotational direction and stops rotation of the first driving device.

BRIEF DESCRIPTION OF THE ACCOMPANYING DRAWINGS

Figure 3:
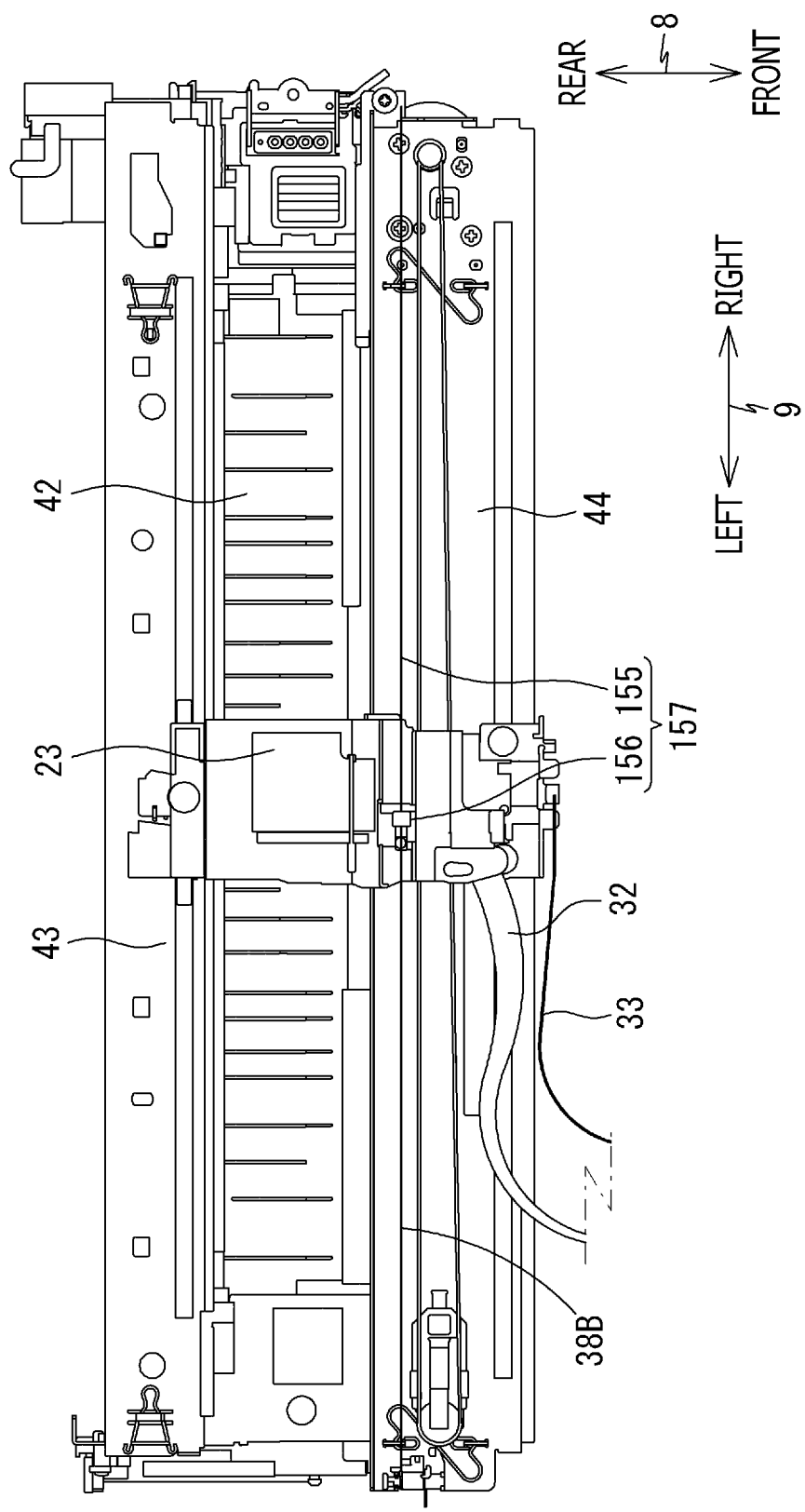

FIG. 3 is a plan view of a carriage 23 and guide rails 43, 44 in the printer 11 according to the exemplary embodiment of the present disclosure.

Figure 4:
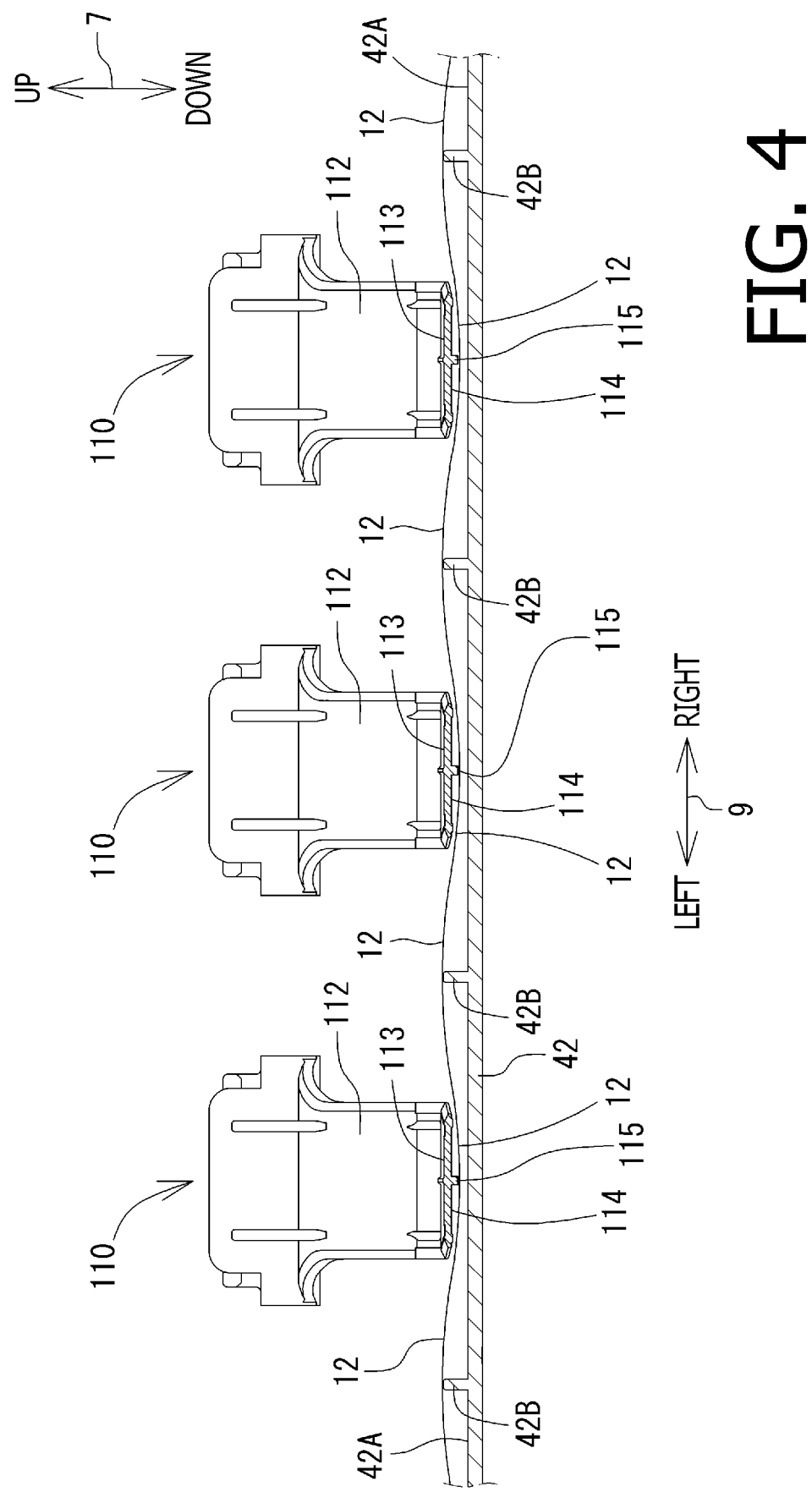

FIG. 4 is a cross-sectional view of a platen 42, contact members 110, and a sheet 12 in the printer 11 according to the exemplary embodiment of the present disclosure.

Figure 5:
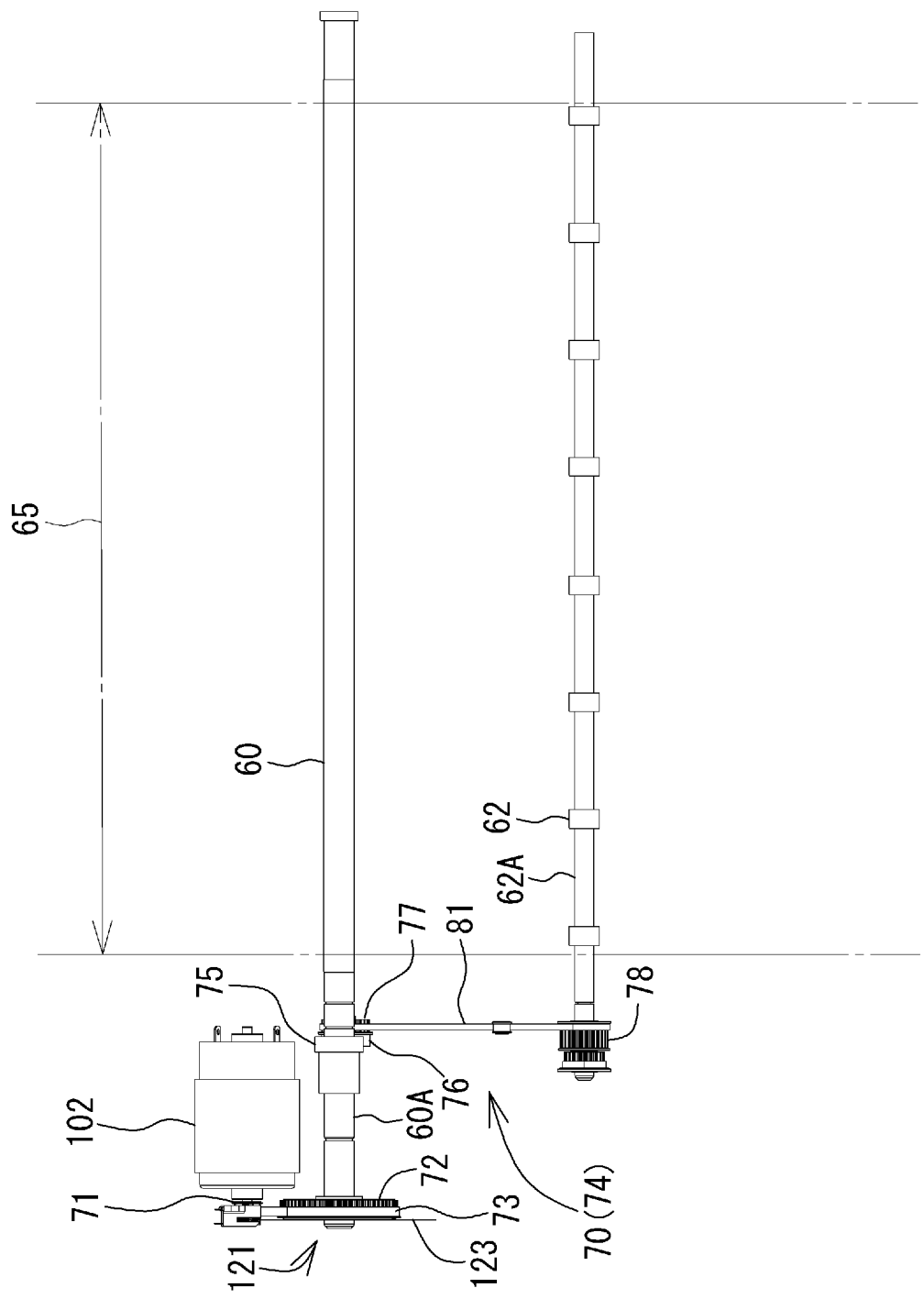

FIG. 5 is a plan view of a driving-force transmission assembly 70, a conveyer roller 60, and an ejection roller 62 in the printer 11 according to the exemplary embodiment of the present disclosure.

Figure 6:
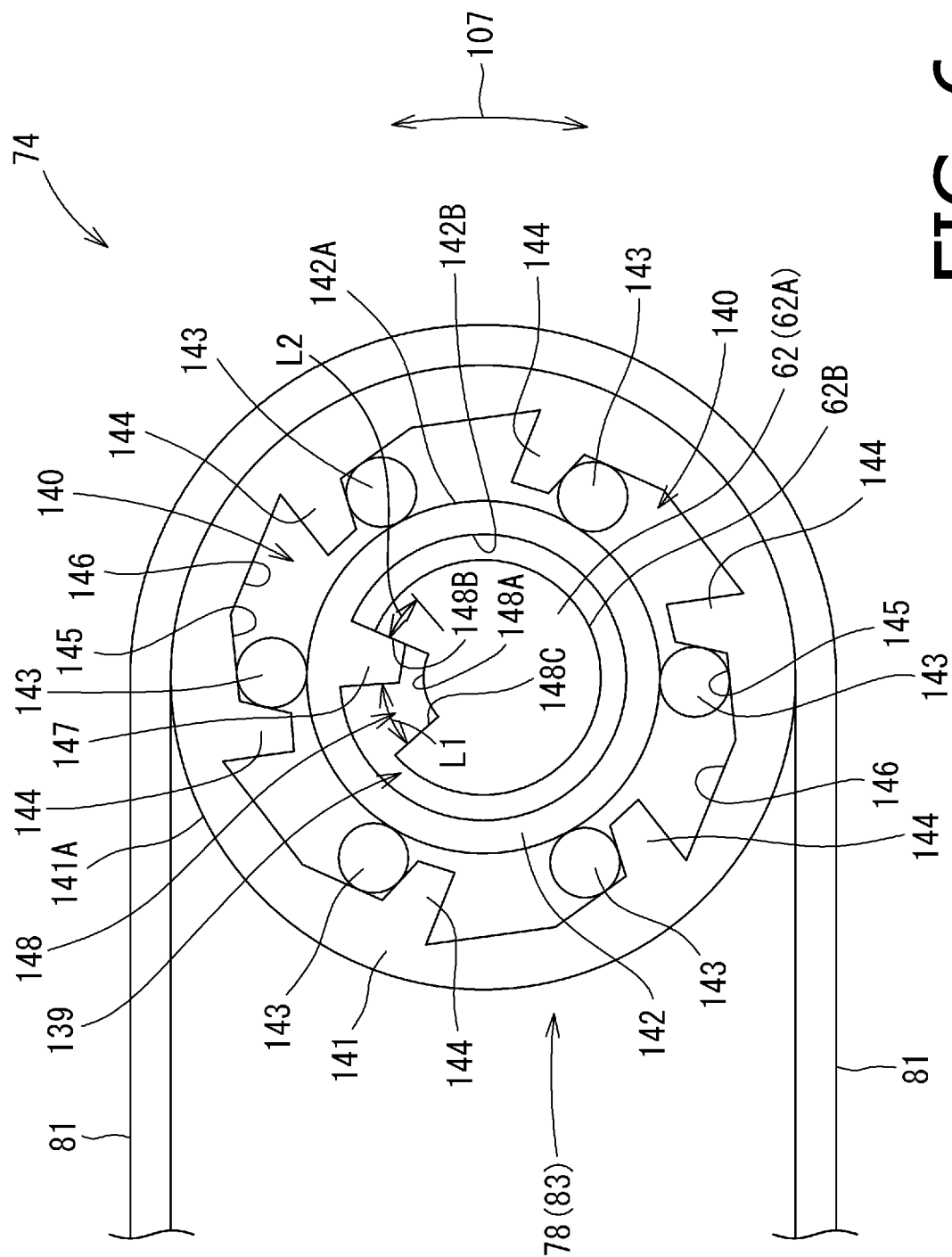

FIG. 6 is an illustrative view of a one-way clutch 83 when rotating in a normal direction according to the exemplary embodiment of the present disclosure.

Figure 7:
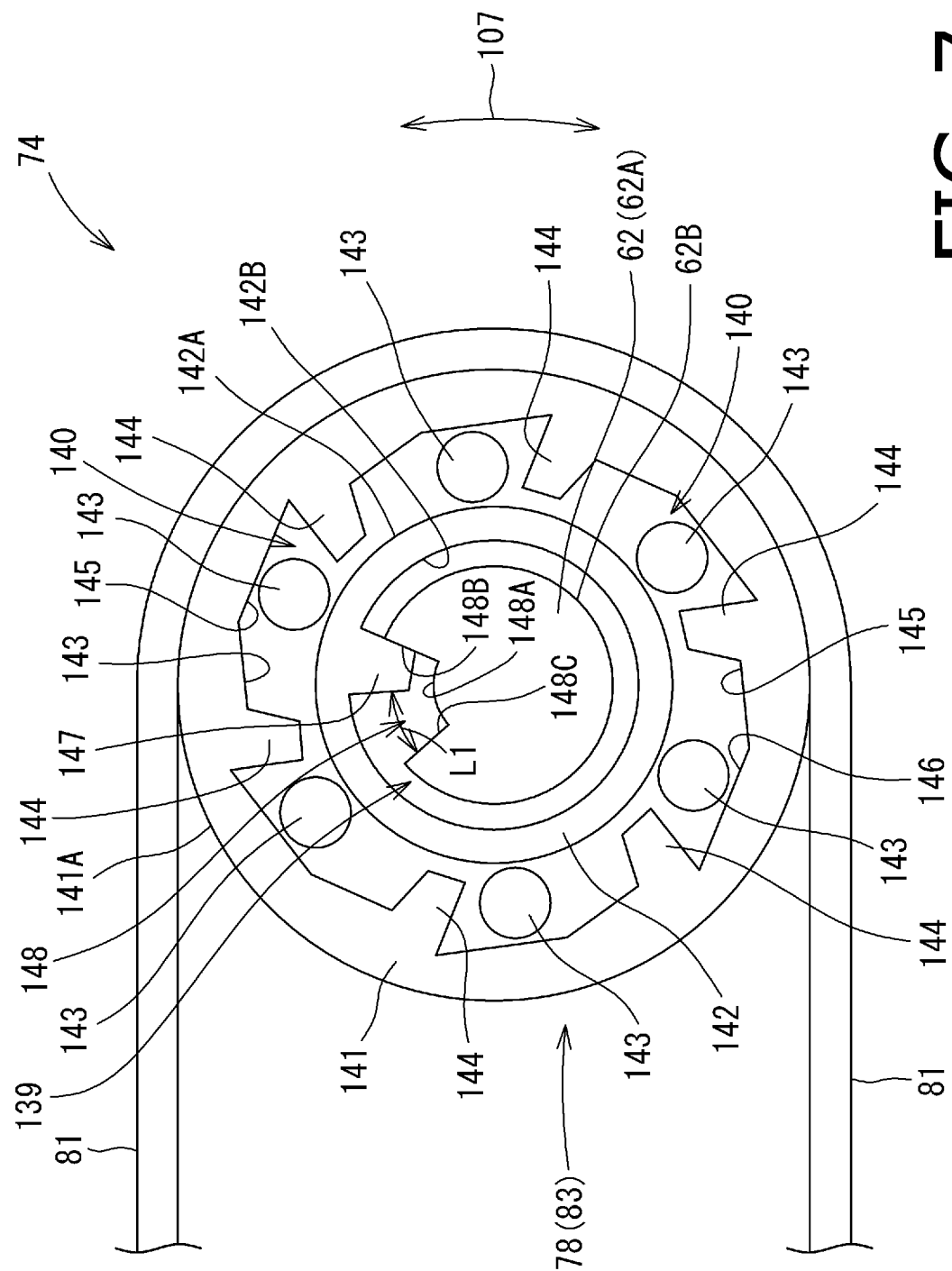

FIG. 7 is an illustrative view of the one-way clutch 83 when rotating in a reverse direction according to the exemplary embodiment of the present disclosure.

Figure 8:
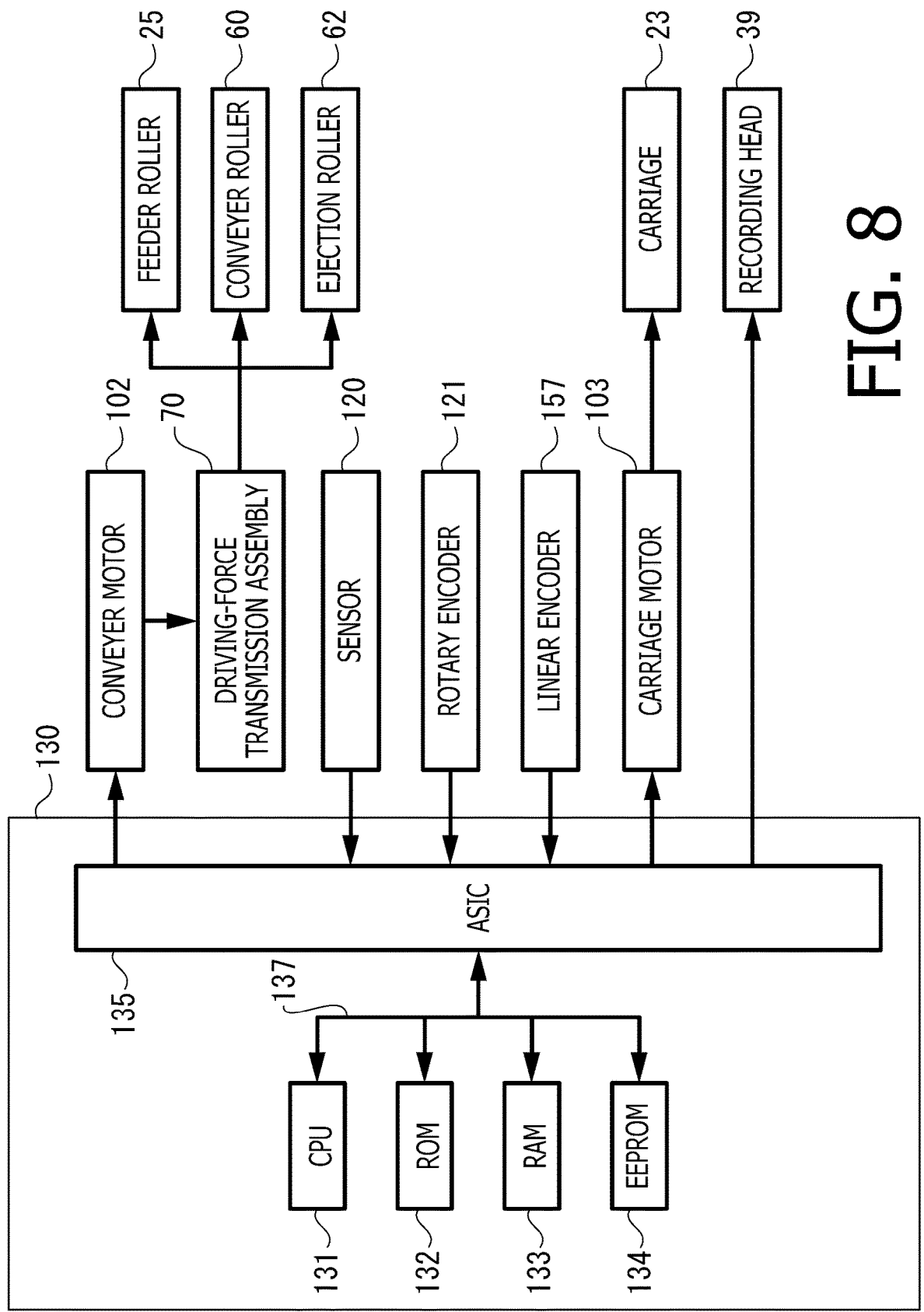

FIG. 8 is a block diagram to illustrate a configuration in the printer 11 according to the exemplary embodiment of the present disclosure.

Figure 9:
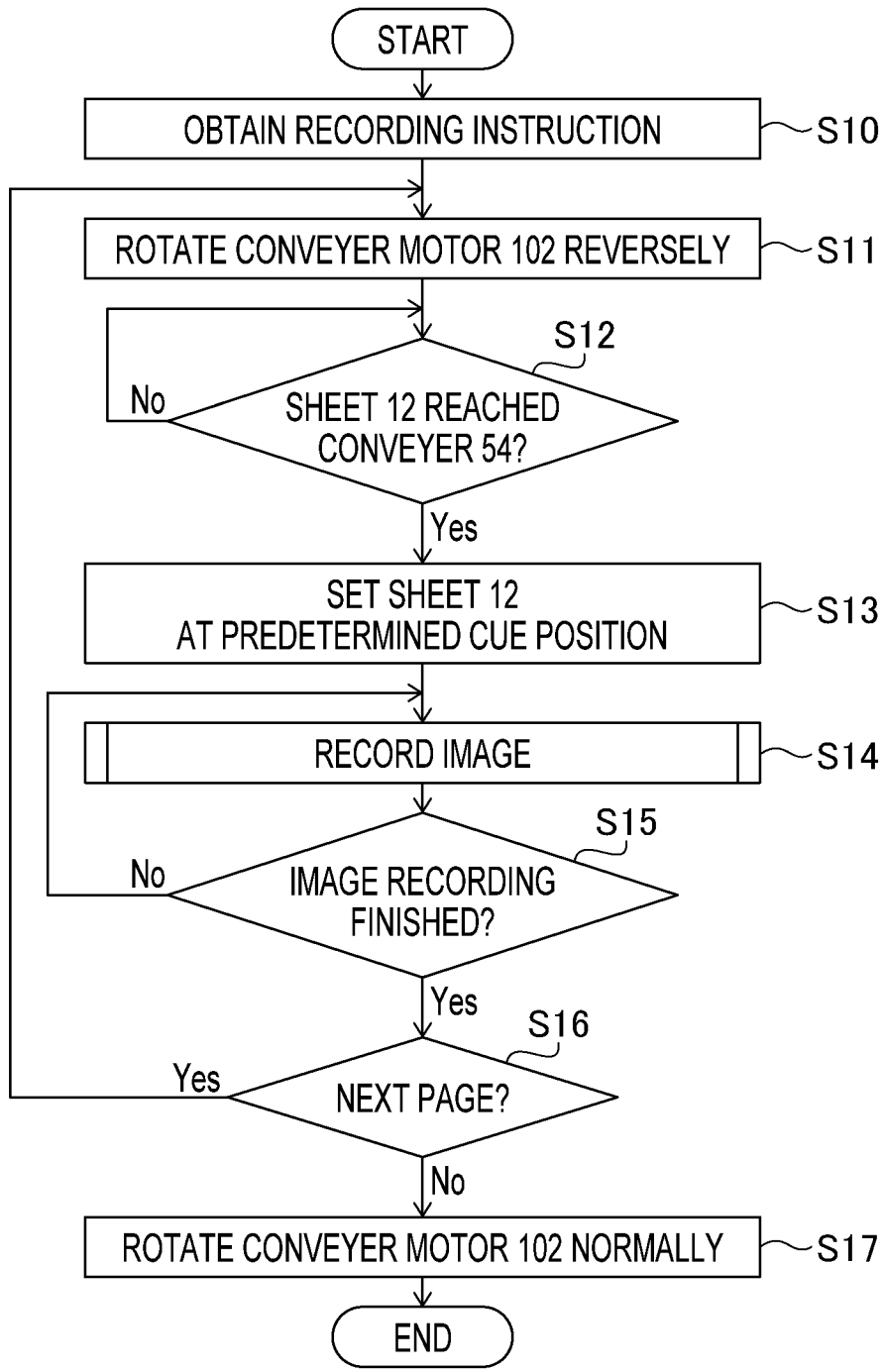

FIG. 9 is a flowchart to illustrate a flow of steps in a recording process to be conducted in the MFP 10 according to the exemplary embodiment of the present disclosure.

Figure 10A:
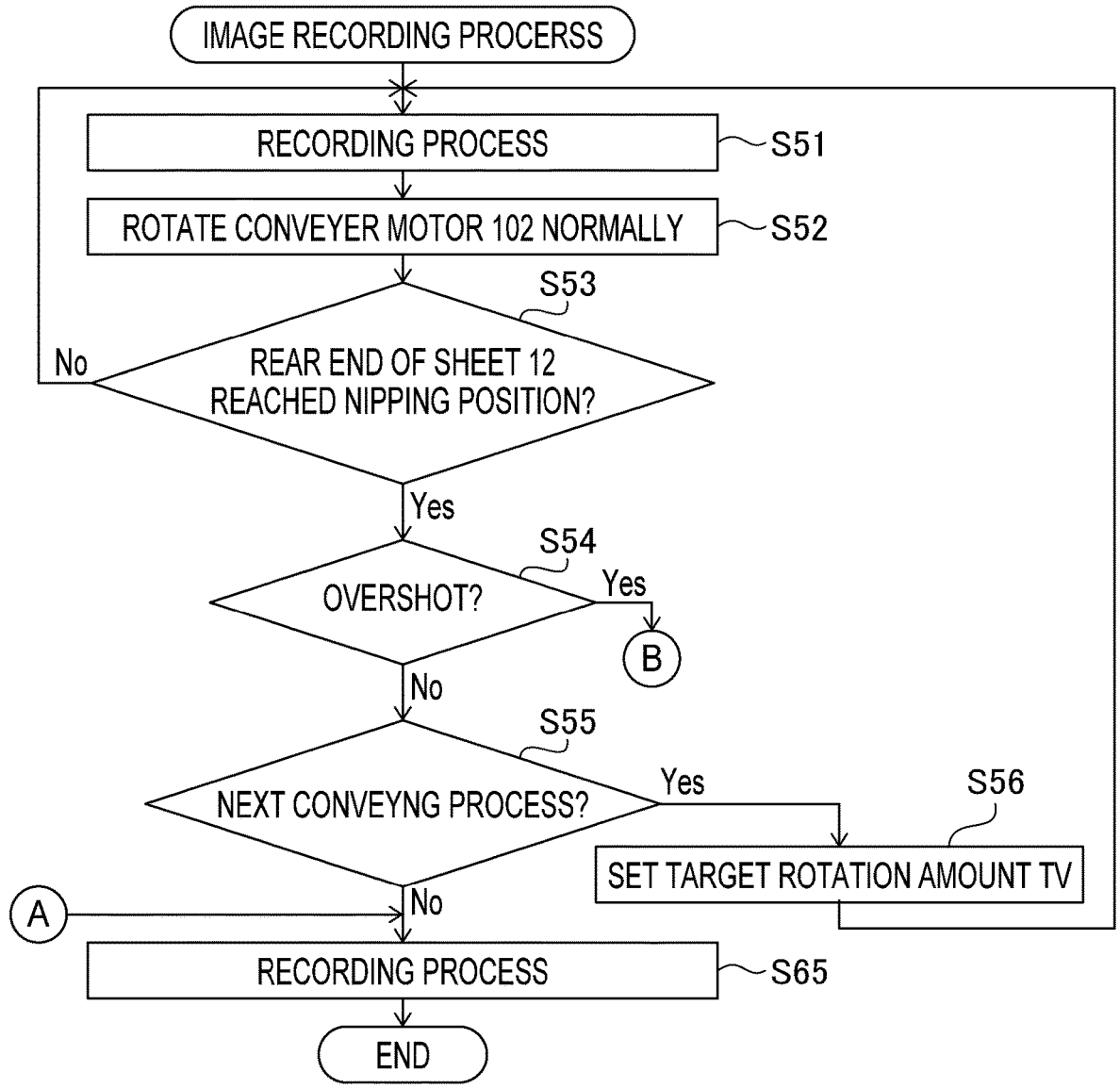
Figure 10B:
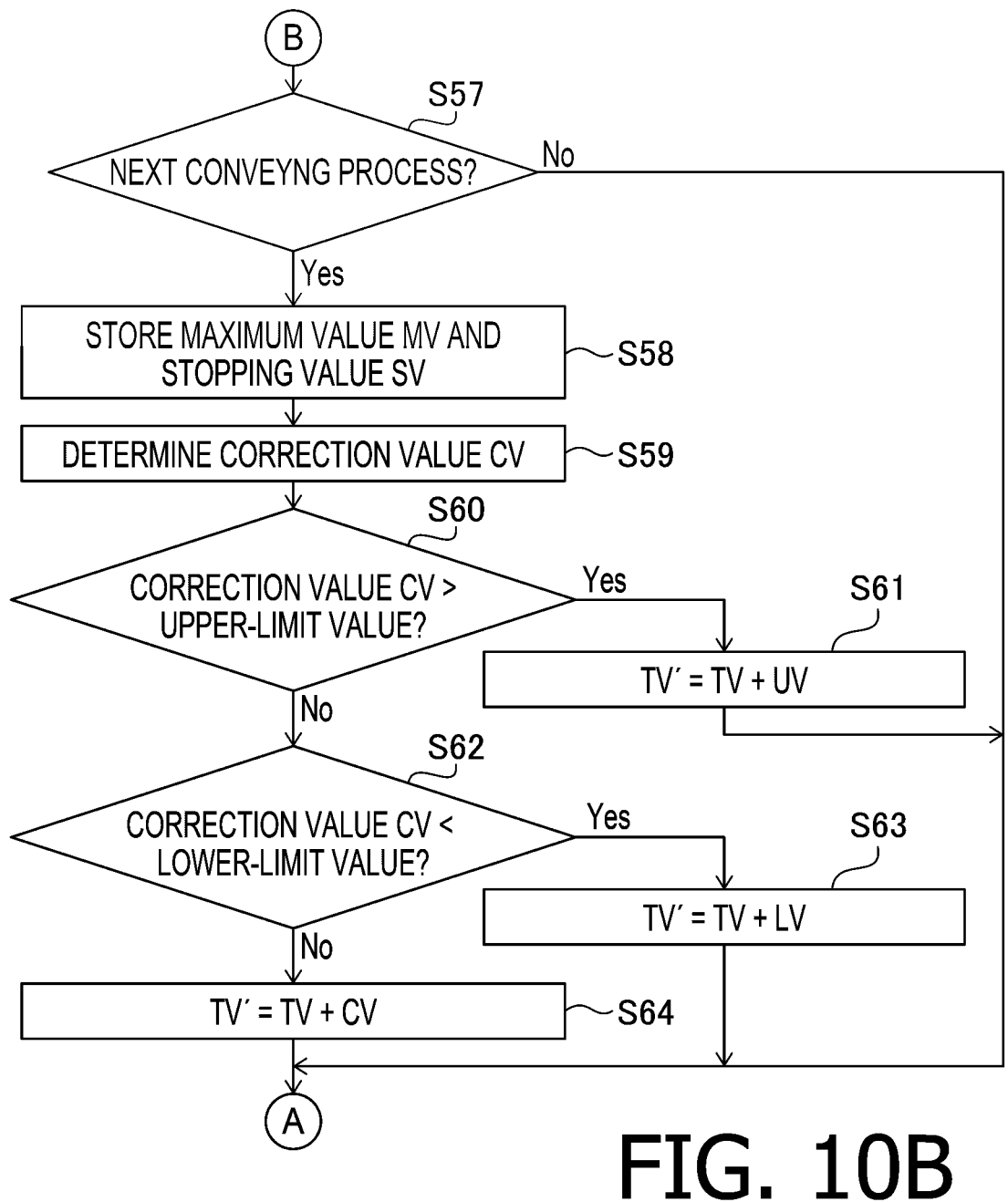

FIGS. 10A-10B are flowcharts to illustrate flows of steps in an image recording process to be conducted in the MFP 10 according to the exemplary embodiment of the present disclosure.

Figure 11:
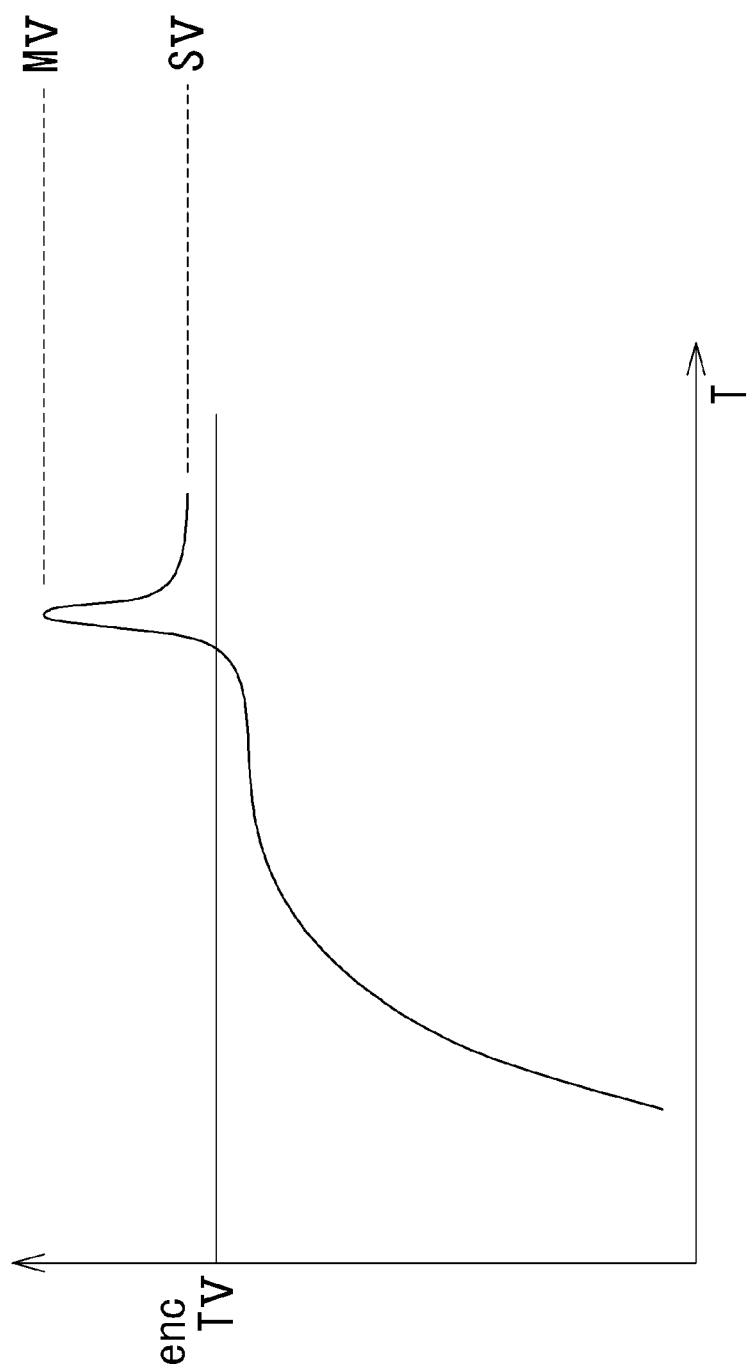

FIG. 11 is a graph to illustrate a rotation amount of the conveyer roller in the MFP 10 according to the exemplary embodiment of the present disclosure.

DETAILED DESCRIPTION

Hereinafter, the exemplary embodiment according to an aspect of the present disclosure will be described in detail with reference to the accompanying drawings.

It is noted that various connections may be set forth between elements in the following description. These connections in general and, unless specified otherwise, may be direct or indirect and that this specification is not intended to be limiting in this respect.

Figure 1:
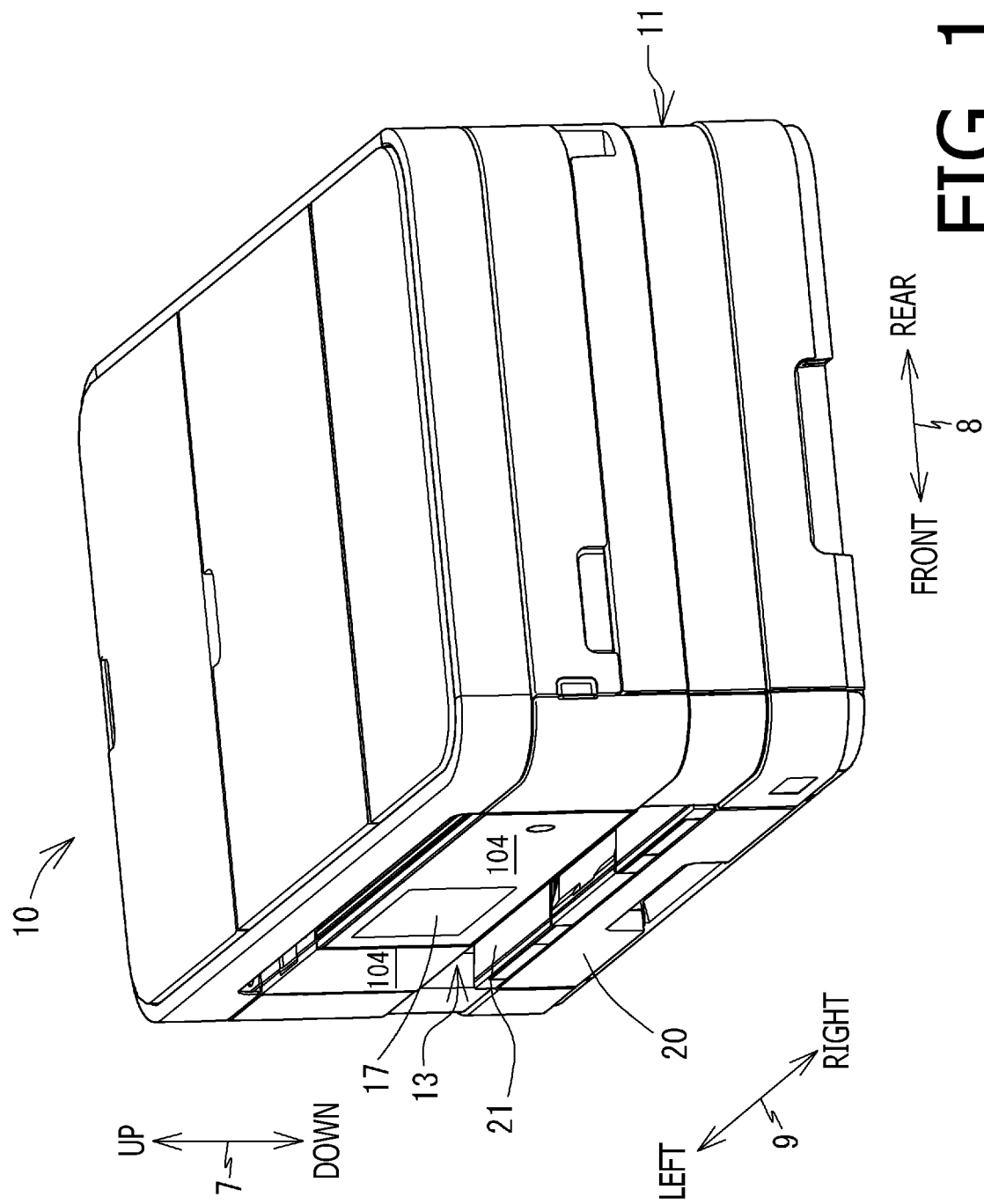
FIG. 1 is a perspective exterior view of a multifunction peripheral (MFP) 10 according to an exemplary embodiment of the present disclosure.

In the following description, positional relation within the MFP 10 and each part or item included in the MFP 10 will be mentioned on basis of a user's position to ordinarily use the MFP 10 in a usable condition as shown in FIG. 1, with reference to an orientation indicated by the bi-directionally pointing arrows in some of the drawings. For example, in FIG. 1, a vertical axis between an upper side and a lower side in the drawing may be defined as a vertical direction 7. While a side, on which an opening 13 is arranged, is defined as a front side 104, a horizontal axis between the front side and a rear side opposite from the front side may be defined as a front-rear direction 8. Further, a horizontal axis between a right-hand side and a left-hand side to the user when the user faces the front side of the MFP 10 may be defined as a widthwise direction 9. The vertical direction 7, the front-rear direction 8, and the widthwise direction 9 are orthogonal to one another.

[Overall Configuration of MFP 10]

The MFP 10 has, as shown in FIG. 1, an overall shape of a six-sided rectangular box. The MFP 10 includes a printer 11 being an inkjet printer, which may record an image on a recordable medium, e.g., a sheet 12, in ink. The MFP 10 may further have a facsimile function and a printing function. However, the printer 11 may not necessarily be limited to the inkjet printer but may be, for example, an electro-photographic printer.

Figure 2:
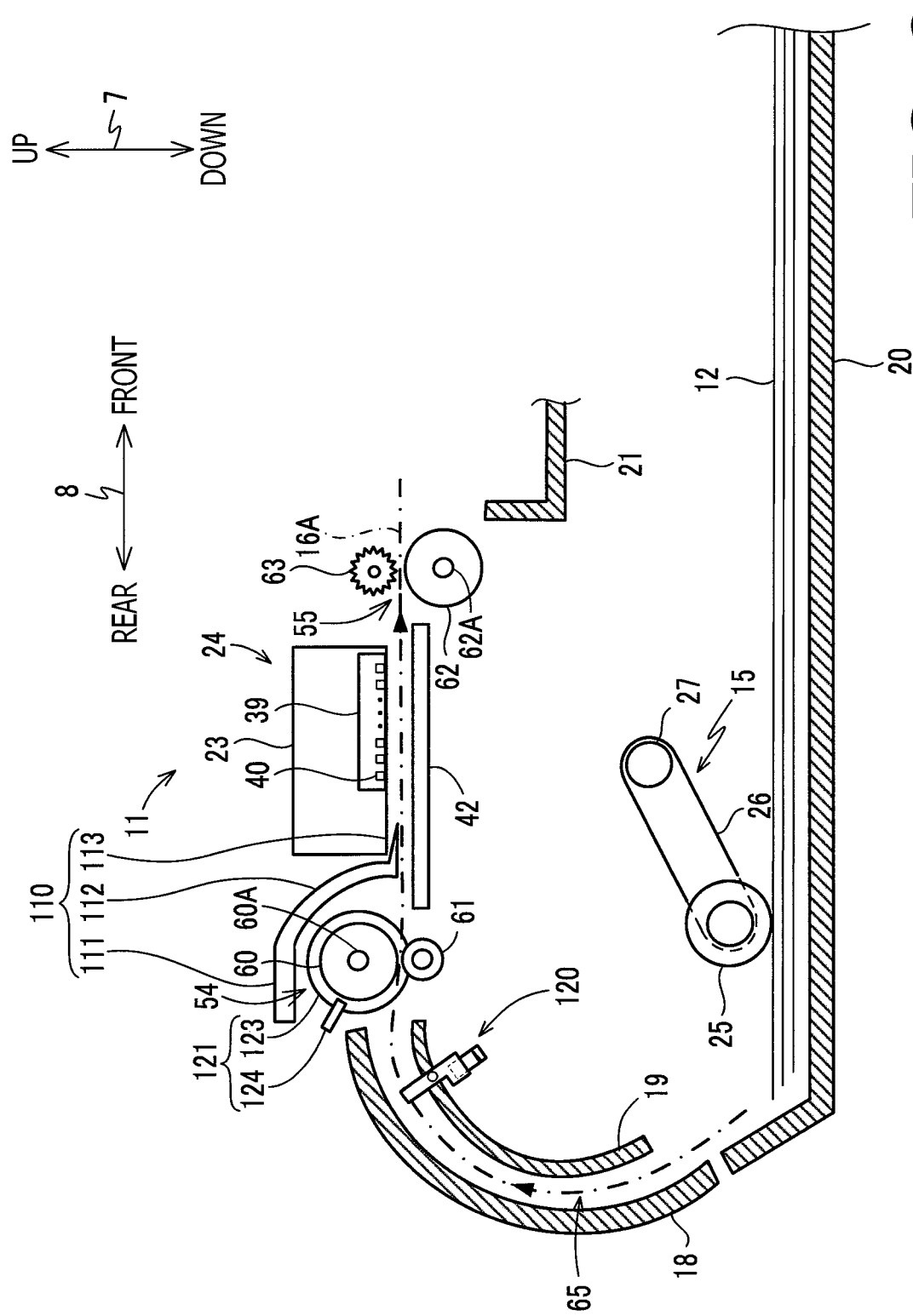
FIG. 2 is a schematic cross-sectional view of a printer 11 in the MFP 10 according to the exemplary embodiment of the present disclosure.

As shown in FIG. 2, the printer 11 includes a feeder tray 20, an ejection tray 21, a feeder 15, a conveyer 54, a recorder 24, a platen 42, contact members 110, a sensor 120, a rotary encoder 121, a linear encoder 157 (see FIG. 3), a conveyer motor 102 (see FIG. 5), and a driving-force transmission assembly 70 (see FIG. 5).

[Feeder Tray 20 and Ejection Tray 21]

As shown in FIGS. 1 and 2, the feeder tray 20 is movable in the front-rear direction 8 through the opening 13 to be attached to or detached from the printer 11. The feeder tray 20 may support one or more sheets 12 stacked thereon. The ejection tray 21 may support the sheet(s) 12 ejected through the opening 13.

[Feeder 15]

The feeder 15 includes, as shown in FIG. 2, a feeder roller 25, a feeder arm 26, and a shaft 27. The feeder roller 25 is rotatably attached to one end of the feeder arm 26. The feeder arm 26 is pivotable about the shaft 27, which is supported by a frame (not shown) of the printer 11. When the conveyer motor 102 (see FIG. 5) rotates in a reverse direction, the feeder roller 25 may rotate clockwise in FIG. 2 and convey the sheet 12 supported by the feeder tray 20 rearward. Thereby, the sheet 12 on the feeder tray 20 may be fed to the conveyer path 65. The sheet 12 fed from the feeder tray 20 to the conveyer path 65 may be conveyed to the conveyer 54, which is arranged on the conveyer path 65.

[Conveyer Path 65]

As shown in FIG. 2, inside the printer 11, formed is the conveyer path 65, in which the sheet 12 may travel. The conveyer path 65 refers to a space defined by guide members 18, 19, which are spaced apart from each other and face each other inside the printer 11. The conveyer path 65 includes a curved conveyer path and a linear conveyer path. The curved conveyer path makes a U-turn while extending from a lower position to an upper position at a rear area in the printer 11. The linear conveyer path extends from the conveyer 54 to the ejection tray 21 through the recorder 24. However, the conveyer path 65 may not necessarily include the curved conveyer path and the linear conveyer path as shown in FIG. 2. For example, the conveyer path 6 may consist solely of a linear conveyer path.

[Conveyer 54 and Ejection Device 55]

As shown in FIG. 2, the conveyer 54 includes a conveyer roller 60 and a pinch roller 61, which are paired to face each other. The conveyer roller 60 may be driven by the conveyer motor 102 to rotate about a rotation axis, which extends along the widthwise direction 9. The pinch roller 61 may be rotated by the rotation of the conveyer roller 60.

The ejection device 55 includes an ejection roller 62 and a spur wheel 63, which are paired to face each other. The ejection roller 62 may be driven by the conveyer motor 102 to rotate about a rotation axis, which extends along the widthwise direction 9. The spur roller 63 may be rotated by the rotation of the conveyer roller 60.

[Recorder 24]

The recorder 24 is, as shown in FIG. 2, arranged in the conveyer path 65 between the conveyer 54 and the ejection device 55.

The recorder 24 is arranged at an upper position with respect to the platen 42 to face the platen 42 vertically. The platen 42 may support the sheet 12 being conveyed by the conveyer 54 from below. The recorder 24 includes a carriage 23 and a recording head 39.

The carriage 23 is, as shown in FIG. 3, connected with an ink tube 32 and a flexible flat cable 33. The ink tube 32 may supply ink from an ink cartridge (not shown) to the recording head 39. The flexible flat cable 33 electrically connects the recording head 39 with a control board (not shown), on which a controller 130 (see FIG. 8) is mounted.

The carriage 23 is supported by guide rails 43, 44, which are arranged along the widthwise direction 9 to be spaced apart in the front-rear direction 8 from each other. The guide rails 43, 44 extend in the widthwise direction 9. The carriage 23 is coupled with a known driving belt assembly (not shown), which is arranged on the guide rail 44 and may be driven to circulate by a carriage motor 103 (see FIG. 8). As the driving belt assembly circulates, the carriage 23 coupled to the driving belt assembly may reciprocate along the widthwise direction 9.

The recording head 39 is, as shown in FIG. 2, mounted on the carriage 23. A lower surface of the recording head 39 forms a nozzle surface, in which a plurality of nozzles 40 are formed. The recording head 39 may be driven to discharge ink droplets through the nozzles 40. As the carriage 23 moves along the widthwise direction 9, the recording head 39 may discharge the ink droplets at the sheet 12, which is on the platen 42, to record an image on the sheet 12 in the ink.

[Contact Members 110]

As shown in FIG. 2, contact members 110 are arranged in the conveyer path 65 on an upstream side of the nozzles 40 in a conveying direction 16A. As shown in FIG. 4, the contact members 110 are spaced apart from one another in the widthwise direction 9. As shown in FIGS. 2 and/or 4, each contact member 110 includes a mounting portion 111, a curved portion 112, and a contact portion 113.

The mounting portion 111 has a substantially flat plate shape. Each mounting portion 111 is mounted on the guide rail 43.

The curved portion 112 projects frontward, i.e., downstream in the conveying direction 16A, from the mounting portion 111. The curved portion 112 curves downward while extending frontward. The contact portion 113 projects frontward from a tip end portion, or a frontend portion, of the curved portion 112. The contact portion 113 faces the platen 42 in the vertical direction 7. The sheet 12 may be conveyed between lower surfaces 114 (see FIG. 4) of the contact portions 113 and the platen 42.

As shown in FIG. 4, the lower surface 114 of each contact portion 113 has a contact rib 115 projecting downward. The lower end of the contact rib 115 may abut on an image recording surface, i.e., an upper surface, of the sheet 12 supported by the platen 42. Thus, the sheet 12 may be pressed downward, i.e., against the platen 42, by the contact portions 113.

On the other hand, a plurality of supporting ribs 42B are formed on an upper surface 42A of the platen 42. The plurality of supporting ribs 42B are spaced apart from one another in the widthwise direction 9. Each supporting rib 42B extends along the conveying direction 16A. Each supporting rib 42B is formed at a position, in which none of the contact portions 113 is formed, in the widthwise direction 9. In other words, the contact portions 113 and the supporting ribs 42B do not face one another.

Each supporting rib 42B projects upward to be higher than lower ends of the contact ribs 115 of the contact portions 113. Therefore, the sheet 12 supported by the platen 42, in particular, by the support ribs 42B of the platen 42, may be deformed in a corrugated form between the platen 42 and the contact portions 113 in a view along the front-rear direction 8.

[Sensor 120]

The printer 11 includes, as shown in FIG. 2, the sensor 120, which is disposed in the conveyer path 65 on an upstream side, e.g., a rear side, of the conveyer 54 in the conveying direction 16A. The sensor 120 may detect presence of the sheet 12 at a location of the sensor 120. The sheet 12 conveyed by the feeder 15 may pass through the location of the sensor 120 and reach the conveyer 54. The sensor 120 may output different-leveled detection signals depending on presence and absence of the sheet 12 at the location of the sensor 120. For example, the sensor 120 may output a high-leveled detection signal to the controller 130 in response to detecting presence of the sheet 12 at the location of the sensor 120 and a low-leveled detection signal to the controller 130 in response to detection of absence of the sheet 12 at the location.

[Rotary Encoder 121]

The printer 11 includes, as shown in FIG. 2, a rotary encoder 121 in a known configuration, which may generate pulse signals according to the rotation of the conveyer roller 60. The rotary encoder 121 includes an encoder disc 123 and an optical sensor 124. The encoder disc 123 may rotate along with the rotation of the conveyer roller 60. The optical sensor 124 may read the rotation of the encoder disc 123, generate pulse signals corresponding to the rotation of the encoder disc 123, and output the generated pulse signals to the controller 130. The more the conveyer roller 60 rotates, the longer pulse signals the optical sensor 124 may output. In other words, the rotary encoder 121 may output signals according to the amount of rotation of the conveyer roller 60.

[Linear Encoder 157]

As shown in FIG. 3, an encoder strip 155 is arranged on the guide rail 44. The encoder strip 155 may be a strip made of a transparent resin. The encoder strip 155 extends in the widthwise direction 9 and is engaged with supporting ribs (not shown) at a rightward end and a leftward end thereof.

The encoder strip 155 thereon has a pattern, in which light-transmitting portions that transmit light and light-blocking portions that block light are alternately arranged at equal intervals in the longitudinal direction, i.e., along the widthwise direction 9. In the carriage 23, at a position corresponding to the encoder strip 155, arranged is an optical sensor 156 being a transmissive sensor. Thus, the encoder strip 155 and the optical sensor 156 form the linear encoder 157 for detecting the position of the carriage 23. The optical sensor 156 may read the encoder strip 155 while the carriage 23 is being moved, generate pulse signals, and output the generated pulse signals to the controller 130.

[Driving-Force Transmission Assembly 70]

The printer 11 includes, as shown in FIG. 8, a driving-force transmission assembly 70. The driving-force transmission assembly 70 may transmit the driving force from the conveyer motor 102 to the feeder roller 25, the conveyer roller 60, and the ejection roller 62. One or more of a gear, a pulley, an endless belt, a planet-gear system, and a one-way clutch may be assembled together to form the driving-force transmission assembly 70.

As shown in FIG. 5, the driving-force transmission assembly 70 includes a pulley 71, which may rotate integrally with a shaft of the conveyer motor 102, a pulley 72, which may rotate integrally with a shaft 60A of the conveyer roller 60, and a belt 73 strained around the pulleys 71, 72. In this arrangement, normal rotation of the conveyer motor 102 transmitted to the conveyer roller 60 may cause the conveyer roller 60 to rotate normally in a normal direction, and reverse rotation of the conveyer motor 102 transmitted to the conveyer roller 60 may cause the conveyer roller 60 to rotate reversely in a reverse direction. The conveyer roller 60 may rotate normally to convey the sheet 12 nipped between the conveyer roller 60 and the pinch roller 61 in the conveying direction 16A.

As shown in FIG. 5, the driving-force transmission assembly 70 includes a transmission device 74, which may transmit the rotation of the conveyer motor 102 to the ejection roller 62 through the shaft 60A of the conveyer roller 60. However, the specific configuration for transmitting the rotation of the conveyer motor 102 to the ejection roller 62 may not be limited to the example described below.

The transmission device 74 shown in FIG. 5 may transmit the normal rotation of the conveyer motor 102, transmitted through the shaft 60A of the conveyer roller 60, to the ejection roller 62. As shown in FIG. 5, the transmission device 74 may be arranged on a left side of the conveyer path 65. However, a position of the transmission device 74 may not be limited to the position shown in FIG. 5. Optionally, for example, the transmission device 74 may be arranged on a right side of the conveyer path 65.

The transmission device 74 include gears 75, 76, which mesh with each other, pullies 77, 78, an endless belt 81, and a one-way clutch 83 (see FIGS. 6-7).

The gear 75 meshes with the gear 76 and rotates integrally with the shaft 60A of the conveyer roller 60. The gear 76 and the pulley 77 rotate coaxially and integrally. In other words, the pulley 77 rotates in conjunction with the rotation of the conveyer roller 60. The pulley 78 is attached to a shaft 62A of the ejection roller 62 through the one-way clutch 83. In other words, as the pulley 78 rotates, the ejection roller 62 rotates in conjunction with the pulley 78.

The one-way clutch 83 rotates integrally with the ejection roller 62 when the normal rotation of the conveyer motor 102 is transmitted thereto. In other words, the one-way clutch 83 may transmit the normal rotation of the conveyer motor 102 transmitted through the pulley 78 to the shaft 62A of the ejection roller 62. On the other hand, the one-way clutch 83 idles with respect to the ejection roller 62 when the reverse rotation of the conveyer motor 102 is transmitted thereto. In other words, the one-way clutch 83 may not transmit the reverse rotation of the conveyer motor 102 transmitted through the pulley 78 to the shaft 62A of the ejection roller 62.

As shown in FIG. 6, the one-way clutch 83 includes an outer wheel 141, an inner wheel 142, and rollers 143.

The outer wheel 141 is tubular. The belt 81 is strained around an outer circumferential surface 141A of the outer wheel 141. The inner wheel 142 is arranged inside the outer wheel 141. The outer wheel 141 and the inner wheel 142 are rotatable around the shaft 62A, that is, rotatable in a circumferential direction 107 of the pulley 78. Between the inner wheel 142 and the outer wheel 141, a gap 140 is formed, and the rollers 143 are arranged in the gap 140.

On an inner circumferential surface of the outer wheel 141, a plurality of protrusions 144, first surfaces 145, and second surfaces 146 are formed.

The plurality of protrusions 144 are formed to be spaced apart from one another along the circumferential direction 107 of the pulley 78. A quantity of protrusions 144 may be, but not limited to, six (6). Distances between two adjoining protrusions 144 may either be equal or different. The protrusions 144 project inward in a radial direction of the pulley 78, i.e., toward the inner wheel 142, which is located closer to a rotation axis of the pulley 78.

Each first surface 145 and each second surface 146 are located between two adjoining protrusions 144 in the circumferential direction 107.

Each first surface 145 extends from the protrusion 144 toward one side in the circumferential direction 107, e.g., clockwise in FIG. 6. The first surface 145 inclines with respect to the circumferential direction 107 so that a distance between an outer circumferential surface 142A of the inner wheel 142 in the radial direction of the pulley 78 and the first surface 145 increases as the first surface 145 extends in the clockwise direction in FIG. 6. One end of the first surface 145 in the circumferential direction 107 is continuous with the protrusion 144. The other end of the first surface 145 in the circumferential direction 107 is continuous with the second surface 146.

Each second surface 146 extends substantially along the circumferential direction 107. One end of the second surface 146 in the circumferential direction 107 is continuous with the other end of the first surface 145. The other end of the second surface 146 in the circumferential direction 107 is continuous with the protrusion 144.

Each roller 143 is arranged between two adjoining protrusions 144. A quantity of the rollers 143 in the one-way clutch 83 may be, but not limited to, six (6). The quantity of the rollers 143 depends on the quantity of protrusions 144.

A distance between the second surface 146 and the outer circumferential surface 142A of the inner wheel 142 in the radial direction of the pulley 78 is larger than a diameter of the roller 143. A distance between the other end of the first surface 145 and the outer circumferential surface 142A in the radial direction of the pulley 78 is larger than the diameter of the roller 143. A distance between the one end of the first surface 145 and the outer circumferential surface 142A in the radial direction of the pulley 78 is smaller than the diameter of the roller 143. Therefore, as shown in FIG. 6, when the roller 143 is located between the first surface 145 and the outer circumferential surface 142A in the radial direction of the pulley 78, the roller 143 may be wedged immovably between the first surface 145 and the outer circumferential surface 142A. On the other hand, as shown in FIG. 7, when the roller 143 is located between the second surface 146 and the outer circumferential surface 142A in the radial direction of the pulley 78, the roller 143 is movable along the circumferential direction 107.

The inner wheel 142 is tubular. The shaft 62A of the ejection roller 62 is located inside the inner wheel 142. A gap 139 is formed between the inner wheel 142 and the shaft 62A. A protrusion 147 is formed on an inner circumferential surface 112B of the inner wheel 142. The protrusion 147 projects inward in the radial direction of the pulley 78, i.e., toward the shaft 62A, which is located closer to the rotation axis of the pulley 78. The protrusion 147 may move in the circumferential direction 107 in synchronization with the rotation of the inner wheel 142. The protrusion 147 is located in a recess 148 in the shaft 62A through the gap 139.

The shaft 62A has the recess 148. The recess 148 is carved inward from the outer circumferential surface 62B of the shaft 62A toward the center in the radial direction of the pulley 78. The recess 148 is formed of a bottom surface 148A and two (2) side surfaces 148B, 148C. The side surfaces 148B, 148C are surfaces connecting the bottom surface 148A and the outer circumferential surface 62B. The side surfaces 148B, 148C face each other and are spaced apart from each other in the circumferential direction 107. The protrusion 147 projecting into the recess 148 is located between the side surfaces 148B and 148C. The protrusion 147, the side surface 148B, and the side surface 148C are arranged between the pulley 78 and the shaft 62A in a transmission path to transmit the rotation of the conveyer motor 102.

A distance between the side surface 148B and the side surface 148C in the circumferential direction 107 is longer by a distance L1 than a length of the part of the protrusion 147 projecting into the recess 148 in the circumferential direction 107. In other words, the protrusion 147 may move at a maximum distance L1 within the recess 148.

In the state shown in FIG. 6, the shaft 62A of the ejection roller 62 may rotate clockwise, in other words, the ejection roller 62 may rotate in the direction to convey the sheet 12 in the conveying direction 16A. When the shaft 62A rotates by an amount greater than or equal to a predetermined amount, e.g., by an amount to cause the side surface 148C to move the distance L1, the side surface 148C may push the protrusion 147, so that the inner wheel 142 of the pulley 78 may rotate. In other words, the ejection roller 62, which may rotate in the direction to convey the sheet 12 in the conveying direction 16A, may idle with respect to the pulley 78 by the amount, in which the side surface 148C moves the distance L1.

When the normal rotation of the conveyer motor 102 is transmitted to the outer wheel 141 through the belt 81, the outer wheel 141 may rotate clockwise as shown in FIG. 6. Therefore, the protrusions 144, the first surfaces 145, and the second surfaces 146 may rotate clockwise in FIG. 6, and the protrusions 144 may approach the respective rollers 143. As a result, each roller 143 may be wedged between the first surface 145 and the outer circumferential surface 142A of the inner wheel 142. Therefore, the inner wheel 142 may rotate integrally with the outer wheel 141 through the rollers 143. In other words, the inner wheel 142 may rotate clockwise in FIG. 6.

As a result, the protrusion 147 may contact and push the side surface 148B of the recess 148 in the shaft 62A of the ejection roller 62. The shaft 62A may rotate integrally with the outer wheel 141 and the inner wheel 142 in synchronization with the movement of the side surface 148B pushed by the protrusion 147. Thus, the one-way clutch 83 may transmit the normal rotation of the conveyer motor 102 transmitted through the pulley 78 to the shaft 62A of the ejection roller 62 and rotate the ejection roller 62 in conjunction with the rotation of the pulley 78.

A distance between the protrusion 147 and the side surface 148C in the circumferential direction 107 in the arrangement where the protrusion 147 contacts the side surface 148B, i.e., the arrangement shown in FIG. 6, is the distance L1 described above.

On the other hand, when the reverse rotation of the conveyer motor 102 is transmitted to the outer wheel 141 through the belt 81, the outer wheel 141 may rotate counterclockwise in FIG. 6. Therefore, the protrusions 144, the first surfaces 145, and the second surfaces 146 may rotate counterclockwise in FIG. 6, and the protrusions 144 may move away from the rollers 143. As a result, as shown in FIG. 7, each roller 143 is located between the second surface 146 and the outer circumferential surface 142A of the inner wheel 142 to be movable in the gap 140. Therefore, the rotation of the outer wheel 141 may not be transmitted to the inner wheel 142 or the shaft 62A of the ejection roller 62. In other words, when the outer wheel 141 rotates reversely, the ejection roller 62 may not rotate. Therefore, the one-way clutch 83 may cause the pulley 78 to idle with respect to the ejection roller 62, when the reverse rotation of the conveyer motor 102 is transmitted thereto, and may not cause the ejection roller 62 to rotate.

As the sheet 12 nipped between the conveyer 54 and the ejection device 55 is conveyed in the conveying direction 16A by the normal rotation of the conveyer motor 102, a rear end of the sheet 12, i.e., an upstream end in the conveying direction 16A, may exit the conveyer 54. In other words, the sheet 12 shifts from a state, in which the sheet 12 is nipped by the conveyer 54, to a state, in which the sheet 12 is released from the conveyer 54. At this instant, a force in the conveying direction 16A may momentarily act on the sheet 12 and may be transmitted through the sheet 12 to the ejection roller 62. Due to this momentary force, the ejection roller 62 and the shaft 62A may rotate clockwise in FIG. 6.

As a result, the recess 148 in the shaft 62A may move by a distance L2 in the clockwise direction, the side surface 148B may move away from the protrusion 147, and the side surface 148C may approach the protrusion 147.

In the present embodiment, the length of the protrusion 147 in the circumferential direction 107 and the distance between the side surfaces 148B, 148C in the circumferential direction 107 are in an arrangement such that the distance L1 is greater than the distance L2. In other words, the rotation amount of the shaft 62A to cause the side surface 148C to move clockwise by the distance L1 is greater than the rotation amount of the shaft 62A rotating clockwise due to the force acting on the sheet 12 when the sheet 12, nipped by the conveyer 54 and the ejection device 55 and conveyed in the conveying direction 16A, exits the conveyer 54. The distance L2 may be achieved through experiments, in which the sheet 12 nipped by the conveyer 54 and the ejection device 55 is conveyed in the conveying direction 16A causing the rear end of the sheet 12, i.e., the upstream end in the conveying direction 16A, to exit the conveyer 54.

Since the distance L1 is greater than the distance L2, the side surface 148C may not contact the protrusion 147 due to the clockwise rotation of the shaft 62A in FIG. 6, which may be caused by the force acting on the sheet 12. In other words, the force may not act on the pulley 78, including the inner wheel 142 and outer wheel 141. Therefore, even if the ejection roller 62 is rotated by the force from the sheet 12, the pulley 78 may not rotate. In other words, the ejection roller 62 may idle with respect to the pulley 78. Therefore, the inner wheel 142 may maintain the condition, in which the inner wheel 142 rotates integrally with the outer wheel 141 through the rollers 143. In other words, the one-way clutch 83 may maintain the condition, in which the one-way clutch 83 transmits the driving force from the conveyer roller 60 to the ejection roller 62. Therefore, a situation, in which solely one of the inner wheel 142 and the outer wheel 141 may rotate separately from the other of the inner wheel 142 and the outer wheel 141, may be prevented, and no phase difference may be caused between the inner wheel 142 and the outer wheel 141.

Thereafter, as the normal rotation of the conveyer motor 102 is transmitted from the conveyer roller 60 to the outer wheel 141 through the belt 81, the outer wheel 141 may rotate, and the inner wheel 142 may rotate likewise through the rollers 143. When the protrusion 147 moves the distance L2 due to the rotation of the inner wheel 142, the protrusion 147 may push the side surface 148B. As a result, the ejection roller 62 may rotate.

The belt 81 is strained around pulleys 77, 78. The transmission device 74 may transmit the normal rotation of the conveyer motor 102 from the conveyer roller 60 to the ejection roller 62 to rotate the ejection roller 62 in the normal direction. On the other hand, the transmission device 74 may not transmit the reverse rotation of the conveyer motor 102 from the conveyer roller 60 to the ejection roller 62.

Based on the behaviors described above, the ejection roller 62 may rotate in the direction to convey the sheet 12 nipped between the ejection roller 62 and the spur 63 in the conveying direction 16A by transmission of the normal rotation of the conveyer motor 102 through the transmission device 74. As a result, the sheet 12 may be ejected at the ejection tray 21.

Although detailed description is omitted, the normal rotation of the conveyer motor 102 may not be transmitted to the feeder roller 25, while the reverse rotation of the conveyer motor 102 may be transmitted to the feeder roller 25. Therefore, when the conveyer motor 102 rotates in the reverse direction, the ejection roller 62 may not rotate, but the feeder roller 25 rotates. As the feeder roller 25 rotates, the sheet 12 loaded on the feeder tray 20 may fed to the conveyer path 65 one by one.

[Controller 130]

The controller 130 includes, as shown in FIG. 8, a CPU 131, a ROM 132, a RAM 133, an EEPROM 134, and an ASIC 135, which are mutually connected through an internal bus 137. The ROM 132 may store programs to be executed by the CPU 131 to control actions and operations in the MFP 10 and information including an upper-limit value UV and a lower-limit value LV, which may be called to control conveyance of the sheet 12 described later. The RAM 133 may serve as a storage area to store data and/or signals to be used in the programs and as a work area to process the data and/or the signals. The EEPROM 134 may store configuration information and flags, which should be maintained to be used later even once the power supply to a power source is shut off.

The ASIC 135 is connected with the conveyer motor 102 and the carriage motor 103. The ASIC 135 may generate driving signals to rotate the conveyer motor 102 and the carriage motor 103 and output the generated driving signals to the conveyer motor 102 and the carriage motor 103. The conveyer motor 102 and the carriage motor 103 may rotate either in the normal direction or the reverse direction according to the driving signals from the ASIC 135. For example, the controller 130 may control behaviors of the conveyer motor 102 to drive rollers. For another example, the controller 130 may control behaviors of the carriage motor 103 to move the carriage 23 to reciprocate along the widthwise direction 9. Moreover, the controller 130 may control the recording head 29 to discharge ink through the nozzles 40.

To the ASIC 135, the sensor 120, the rotary encoder 121, and the linear encoder are connected.

The controller 130 may detect presence of the sheet 12 at the location of the sensor 120 based on the detection signals output from the sensor 120.

The controller 130 may obtain a rotated amount of the conveyer roller 60 based on the pulse signals output from the rotary encoder 121. Further, the controller 130 may determine the position of the rear end of the sheet 12 based on the detection signals output from the sensor 120 and the pulse signals output from the rotary encoder 121.

The controller 130 may obtain a moved amount of the carriage 23 based on the pulse signals output from the linear encoder 157. Further, the controller 130 may determine the position of the carriage 23 based on the moved amount of the carriage 23 from a reference position of the carriage 23, e.g., from a right end position or a left end position of a movable area for the carriage 23.

[Image Recording Action]

Next, an image recording process according to the present embodiment will be described with reference to FIGS. 9 and 10A-10B. The image recording process may be conducted by the CPU 131 in the controller 130. The steps in the image recording process described in the following paragraphs may be implemented by the CPU 131 running a program read from the ROM 132 or by a hardware circuit (not shown) mounted on the controller 130.

In response to receiving of a recording instruction for recording an image on the sheet 12 from a user in S10, the controller 130 may conduct the image recording process from S11 and onward. An issuer of the recording instruction may not necessarily be limited, but the recording instruction may be received, for example, through an operation device 17 (see FIG. 1) in the MFP 10 or, for another example, from an external device through a communication network. The recording instruction may include a command for executing the image recording on the sheet 12, information concerning a size and a resolution of the sheet 12, on which the image is to be recorded, and image data describing the image to be recorded on the sheet 12. The controller 130 may control actions in the rollers, the carriage 23, and the recording head 39 according to the received recording instruction to record the image on the sheet 12.

In S11, the controller 130 that received the recording instruction drives the conveyer motor 102 to rotate in the reverse direction. Thereby, the feeder roller 25 rotates, and the sheet 12 supported by the feeder tray 20 is fed rearward to the conveyer path 65. Meanwhile, the conveyer roller 60 rotates in the reverse direction, and the ejection roller 62 stays stationary without rotating. The sheet 12 fed to the conveyer path 65 is conveyed in the conveying direction 16A toward the conveyer 54. When a front end of the sheet 12, i.e., a downstream end in the conveying direction 16A, reaches the sensor 120, the sensor 120 outputs a low-level signal to the controller 130. Once the sheet 12 reaches the sensor 120 and the controller 130 receives the low-level signal, the controller 130 determines the position of the front end of the sheet 12 by the pulse signals from the rotary encoder 121.

In S12, when the sheet 12 reaches the conveyer 54 (S12: Yes), in S13, the controller 130 switches the conveyer motor 102 to rotate in the normal direction and cue the sheet 12 to set the front end of the sheet 12 at a predetermined cue position below the recording head 39. In particular, the feeder roller 25 stops rotating, and the conveyer roller 60 and the ejection roller 62 rotate in the normal direction so that the sheet 12 is conveyed by the conveyer 54 in the conveying direction 16A to the cue position. Before the rotational direction of the conveyer motor 102 is switched to the normal direction, in other words, while the conveyer motor 102 was rotating in the reverse direction, as the sheet 12 reaches and contacts the conveyer 54, skew of the sheet 12 may be corrected.

Next, in S14, the controller 130 executes image recording on the sheet 12. The image recording is an action, in which a conveying process and a recording process are repeated alternately until an entire image is completed on the sheet 12. The image recording action will be described further below.

In S15, when the image recording on the sheet 12 is completed (S15: Yes), in S16, the controller 130 determines whether the image data included in the recording instruction includes data for an image that has not yet been recorded on the sheet 12, in other words, whether the image recording on a next page remains undone.

In S16, if image recording for a next page remains (S16: Yes), the controller 130 repeats S11 and onward. In other words, in S11-S15, the controller 130 feeds a next sheet 12 from the feeder tray 20 to the conveyer path 65, and records an image on the next sheet 12. Meanwhile, by rotating the conveyer motor 102 normally in S13 and S14, the preceding sheet 12, i.e., the sheet 12, on which recording of the image has been completed, is conveyed in the conveying direction 16A by the ejection device 55 and ejected at the ejection tray 21.

On the other hand, in S16, when no image recording for a next page remains (S16: No), in S17, the controller 130 rotates the conveyer motor 102 normally. As a result, the sheet 12, on which recording of the image is completed, is conveyed in the conveying direction 16A by the ejection device 55 and ejected at the ejection tray 21.

[Image Recording Process]

As shown in FIGS. 10A-10B, in the image recording process, the controller 130 alternately conducts the conveying process (S52-S64) and the recording process (S51).

In the conveying process, the sheet 12 that reached the conveyer 54 is conveyed further in the conveying direction 16A by a predetermined line-feed amount by at least one of the conveyer 54 and the ejection device 55. In the recording process, ink is discharged from the recording head 39 at the sheet 12 having been conveyed by the predetermine line-feed amount.

In S51, the controller 130 conducts the recording process on the sheet 12 set at the cue position. In the recording process, the controller 130 drives the carriage motor 103 to move the carriage 23 along the widthwise direction 9 and the recording head 39 to discharges ink at the sheet 12 at predetermined timings. The image recorded on the sheet 12 in a single recording process is an image recording by a single pass. For a single image recording for a single pass, the controller 130 conducts a single conveyer process.

In the conveying process, the controller 130 rotates the conveyer motor 102 in the normal direction to rotate the conveyer roller 60 and the ejection roller 62 in the normal direction. Specifically, the controller 130 reads a target rotation amount TV or a post-correction rotation amount TV' stored in the RAM 133 and controls the conveyer motor 102 based on the read target rotation amount TV or the post-correction rotation amount TV'. The target rotation amount corresponds to the line-feed amount and is set based on the pass, in which the image has been recorded, and a pass, in which an image is to be recorded next, based on the received image data. Details of the post-correction rotation amount TV' will be described later.

The controller 130 sets a target profile, in which an acceleration time, a rotation velocity, and a deceleration time of the conveyer motor 102 are set, based on the read target rotation amount TV or the post-correction rotation amount TV'.

In S52, the controller 130 rotates the conveyer motor 102 normally according to the target profile. As the conveyer motor 102 rotates normally, the conveyer roller 60 and the ejection roller 62 rotate normally, and the sheet 12 is conveyed in the conveying direction 16A.

While the conveyer motor 102 rotates normally, the controller 130 monitors the rotated amount of the conveyer roller 60 based on the pulse signals output from the rotary encoder 121. The controller 130 conducts feedback control to adjust an amount to rotate the conveyer roller 60 based on a difference between the target rotation amount TV and the rotated amount of the conveyer roller 60. While the controller 130 may drive the conveyer motor 102 according to the target profile to rotate the conveyer roller 60 by the target rotation amount TV, in practice, the conveyer roller 60 may rotate excessively beyond the target rotation amount TV due to disturbance such as a change in resistance acting on the sheet 12. In the conveying process, when the rotated amount of the conveyer roller 60 exceeds the target rotation amount TV, the controller 130 may rotate the conveyer motor 102 reversely to convey the sheet 12 backward based on the excess rotation amount. Therefore, the conveyer roller 60 may rotate in the reverse direction, and the sheet 12 may be conveyed in a reverse direction opposite to the conveying direction 16A. This disturbance may be caused by, for example, when the rear end of the paper 12 passes through the conveyer 54, the rear end of the sheet 12 may be pushed forward in the conveying direction 16A by the force of the conveyer roller 60 and the pinch roller 61 nipping the sheet 12.

When the rear part of the sheet 12 is pushed forward in the conveying direction 16A, the ejection roller 62 may be rotated by the sheet 12 being pushed. Meanwhile, as the conveyer roller 60 rotates in the reverse direction, play may be caused in, for example, the belt 81 and the one-way clutch 83. However, while the conveyer roller 60 rotates in the reverse direction, the ejection roller 62 may not rotate in the reverse direction. Therefore, since the rear end of the sheet 12 has exited the conveyer 54, the sheet 12 may not be conveyed in the reverse direction opposite to the conveying direction 16A but remain stopped. A flying amount, i.e., the amount of the rear end of the sheet 12 pushed forward in the conveying direction 16A, may be absorbed by the distance L2 described above and saved in the one-way clutch 83. Therefore, in the next conveying process, the ejection device 55 may be rotated by a reduced amount, which is reduced from the target conveying distance TV by the distance L2. On the other hand, since the amount of play caused in the belt 81 and the one-way clutch 83 due to the reverse rotation of the conveyer motor 102 may be proportional to the reversely rotated amount of the conveyer roller 60, it may be difficult to minutely correct the play by a fixed value, unlike the distance L2 to the ejection device 55. In the following paragraphs, correction of the amount to rotate the conveyer roller 60 when the rotated amount exceeds the target rotation amount TV will be described.

Once the controller 130 receives the low-level signal from the sensor 120, the controller 130 monitors the position of the front end of the sheet 12 by the pulse signals received from the rotary encoder 121. Further, the controller 130 determines the position of the rear end of the sheet 12 based on the information indicating the size of the sheet 12. In S53, the controller 130 determines whether the position of the rear end of the sheet 12 has reached the nipping position between the conveyer roller 60 and the pinch roller 61, in other words, whether the rear end of the sheet 12 is at a position downstream in the conveying direction 16A from the nipping position. If the position of the rear end of the sheet 12 has not reached the nipping position between the conveyer roller 60 and the pinch roller 61 (S53: No), in S51, the controller 130 conducts the recording process for a next pass.

In S53, when the controller 130 determines that the position of the rear end of the sheet 12 reached the nipping position between the conveyer roller 60 and the pinch roller 61, in other words, when the controller 130 determines that the rear end of the sheet is at a position downstream in the conveying direction 16A from the nipping position (S53: Yes), in S54, the controller 130 determines whether the rotated amount of the conveyer roller 60, which is monitored based on the pulse signals output from the rotary encoder 121, in the conveying process conducted immediately before exceeds the target rotation amount TV. In other words, in S54, the controller 130 determines whether the rotated amount of the conveyer roller 60 overshot the target rotation amount TV. If the rotated amount of the conveyer roller 60 did not exceed the target rotation amount TV (S54: No), and if there is a next conveying process to be conducted (S55: Yes), in S56, the controller 130 sets a target rotation amount TV based on a line-feed amount in the next conveying process and stores the target rotation amount TV in the RAM 133.

If the controller 130 determines that the rotated amount of the conveyer roller 60 exceeded the target rotation amount TV in the conveying process conducted immediately before (S54: Yes) and further determines that there is a next conveying process (S57: Yes), in S58, the controller 130 stores a maximum value MV, which indicates a peak rotated amount for the conveyer roller 60, and a stopping value SV, which indicates the rotated amount when the conveyer roller 60 stopped rotating, in the RAM 133.

FIG. 11 is a graph showing a time course of the rotated amount of the conveyer roller 60 in a single linefeed, with a horizontal axis representing time T and a vertical axis representing the rotated amount, i.e., an encoder amount (enc).

In FIG. 11, when the conveying process starts and the conveyer roller 60 starts rotating, the rotated amount increases with time, and the rotated amount may sharply increase shortly before reaching the target rotation amount TV and continue increasing beyond the target rotation amount TV. When the rotated amount reaches the maximum value MV, the conveyer roller 60 is rotated in the reverse direction to reduce the rotated amount, and the conveyer roller 60 is stopped at the rotated amount slightly exceeding the target rotation amount TV, i.e., at the stopping value SV. The maximum value MV and the stopping value SV to cause the behavior of the conveyer roller 60 are stored in the RAM 133.

In S59, the controller 130 determines a correction value CV. The correction value CV is proportional to a value obtained by subtracting the stopping value SV from the maximum value MV stored in the RAM 133. For example, the controller 130 may determine the correction value CV based on a function preset in the program stored in the ROM 132. This function may be, for example, CV=a (MV-SV), where a is a constant less than 1.

In S60, the controller 130 determines whether the determined correction value CV exceeds the upper-limit value UV. If the controller 130 determines that the determined correction value CV exceeds the upper-limit value UV (S60: Yes), in S61, the controller 130 sets the post-correction rotation amount TV' based on the upper-limit value UV. The post-correction rotation amount TV' is an amount, which is obtained by adding the upper-limit value UV to the target rotation amount TV for a line-feed in the next conveying process (TV'=TV+UV). The post-correction rotation amount TV' set in S61 is stored in the RAM 133.

In S62, the controller 130 determines whether the determined correction value CV is smaller than the lower-limit value LV. If the controller 130 determines that the determined correction value CV is smaller than the lower-limit value LV (S62: Yes), in S63, the controller 130 sets the post-correction rotation amount TV' based on the lower-limit value LV (TV'=TV+LV). The post-correction rotation amount TV' set in S63 is stored in the RAM 133.

In S60, if the controller 130 determines that the correction value CV does not exceed the upper-limit value UV (S60: No), and the correction value CV is not smaller than the lower-limit value LV (S62: No), in S64, the controller 130 sets the post-correction rotation amount TV based on the determined correction value CV (TV'=TV+CV). The post-correction rotation amount TV' set in S64 is stored in the RAM 133.

In S55, if no further next conveying process to be conducted remains (S55: No), in S65, the controller 130 executes the recording process for the last pass and ends the image recording process.

[Benefits]

According to the embodiment described above, the difference caused in the driving-force transmission assembly 70 between the targeted rotation amount and the actual working amount, e.g., the play in the one-way clutch 83, which may be caused when the controller 130 detects overshooting of the conveyer 60, that is, when the conveyer roller 60 was rotated excessively beyond the target rotation amount TV in the conveying process, thereafter rotated in the reverse direction, and once again in the normal direction, may be determined as the correction value CV. Based on the correction value CV, the post-correction rotation amount TV' for the next conveying process may be determined, so that the difference in the actual working amount from the target rotation amount TV in the ejection roller 62 may be finely corrected.

Moreover, on condition that the correction value CV exceeds the upper-limit value UV, the controller 130 may determine the post-correction rotation amount TV' based on the target rotation amount TV and the upper-limit value UV in place of the determined correction value CV. Therefore, when the conveyer roller 60 overshoots the target rotation amount TV to a larger extent beyond the difference caused in the driving-force transmission assembly 70 between the targeted rotation amount and the actual working amount, the controller 130 may be restrained from determining a post-correction rotation amount TV' exceeding the difference.

Moreover, on condition that the correction value CV is smaller than the lower-limit value LV, the controller 130 may determine the post-correction rotation amount TV' based on the target rotation amount TV and the lower-limit value LV in place of the determined correction value CV. Therefore, when the conveyer roller 60 overshoots the target rotation amount TV to a smaller extent, which may not substantially cause the difference in the driving-force transmission assembly 70 between the targeted rotation amount and the actual working amount, the controller 130 may determine a post-correction rotation amount TV' to correct the overshooting more effectively.

Further, the controller 130 may determine the post-correction rotation amount TV' on condition that the rear end of the sheet 12 is at a position downstream from the nipping position of the conveyer 54 in the conveying direction 16A. In other words, when the rear end of the sheet 12 is at a position upstream from the nipping position of the conveyer 54 in the conveying direction 16A, the controller 130 may not determine the post-correction rotation amount TV'. If, for example, a difference in the rotation amounts due to overshooting of the conveyer roller 60 is caused in the driving-force transmission assembly 70, while the sheet 12 is nipped by the conveyer 54, line feed of the sheet 12 in the next conveying process may not likely be affected by the difference. Therefore, the controller 130 may still convey the sheet 12 finely with use of the target rotation amount TV rather than the post-correction rotation amount TV'.

MORE EXAMPLES

Although an example of carrying out the invention has been described, those skilled in the art will appreciate that there are numerous variations and permutations of the image recording apparatus that fall within the spirit and scope of the invention as set forth in the appended claims.

For example, the difference in the rotation amounts may not necessarily be caused between the conveyer roller 60 and the ejection roller 62 but may be caused between the conveyer motor 102 and the conveyer roller 60. In order to correct the difference in the rotation amounts between the conveyer motor 102 and the conveyer roller 6, for example, the encoder disc 123 may be rotatable along with the rotation of the conveyer motor 102, and the rotary encoder 121 may output signals corresponding to the rotation amount of the conveyer motor 102. In this arrangement, a difference in rotation amounts, which may be caused by slack in the belt 73 due to the reverse rotation of the conveyer motor 102, may be corrected finely.

For another example, the driving-force transmission assembly 70 may not necessarily have the one-way clutch 83, but the one-way clutch 83 may be omitted. In other words, the driving-force transmission assembly 70 may consist of gear trains alone, pullies with a belt strained there-around alone, or a combination of gear trains and a belt.

In the above-described embodiment, the arrangement where a difference in rotation amounts in the driving-force transmission assembly 70 is caused when the rear end of the sheet 12 exits the nipping position of the conveyer 54 is described as an example. However, a difference in rotation amounts in the driving-force transmission assembly 70 may not necessarily be caused when the rear end of the sheet 12 exits the nipping position of the conveyer 54 but may be caused in a different behavior. For example, a difference in rotation amounts may be caused in the driving-force transmission assembly 70 when the rear end of the sheet 12 passes through the contact portions 113 in the contact members 110.

What is claimed is:

1. An image recording apparatus, comprising:
   a recorder movable in a moving direction;
   a first driving device configured to be driven rotationally;
   a second driving device configured to convey a recordable medium in a conveying direction by rotating, the conveying direction intersecting with the moving direction;
   a driving-force transmission device configured to drive a rotational driving force from the first driving device to the second driving device;
   a sensor configured to output a signal corresponding to a rotationally driven amount of the first driving device;
   a memory; and
   a controller configured to conduct a conveying process, in which the recordable medium is conveyed in the conveying direction by driving the first driving device rotationally by a target rotation amount in a first rotational direction and stopping rotation of the first driving device, and a recording process, in which a part of an image is recorded on the recordable medium by moving the recorder in the moving direction, alternately and repetitively to record the image on the recordable medium,
   wherein, in the conveying process,
      on condition that the controller determines the rotationally driven amount of the first driving device exceeded the target rotation amount based on the signal output from the sensor, the controller conducts feedback control targeted at the target rotation amount to drive the first driving device rotationally in a second rotational direction reversely from the first rotational direction;
      on condition that the controller determines that the first driving device was rotationally driven in the second rotational direction under the feedback control, the controller stores, based on the signal output from the sensor, a maximum value and a stopping value in the memory, the maximum value indicating a peak rotated amount of the first driving device in the first rotational direction in the conveying process, the stopping value indicating a rotated amount of the first driving device when the rotation of the first driving device was stopped in the conveying process; and
   the controller determines a correction value, the correction value being proportional to a value obtained by subtracting the stopping value from the maximum value; and
   the controller determines a post-correction rotation amount based on the target rotation amount and an amount corresponding to the correction value for the conveying process to be conducted next after the recording process, and
   wherein, in the conveying process conducted next after the recording process, the controller drives the first driving device rotationally by the post-correction rotation amount in the first rotational direction and stops rotation of the first driving device.

2. The image recording apparatus according to claim 1, wherein the memory stores an upper-limit value, and
   wherein the controller is configured to, on condition that the correction value exceeds the upper-limit value, determines the post-correction rotation amount based on the target rotation amount and an amount corresponding to the upper-limit value in place of the correction value.

3. The image recording apparatus according to claim 1, further comprising a driving source,
   wherein the first driving device includes paired first conveyer rollers, to which a driving force from the driving source is transmitted, each of the paired first conveyer rollers being configured to rotate about a rotation axis extending along the moving direction,
   wherein the second driving device includes paired second conveyer rollers located downstream from the paired first conveyer rollers in the conveying direction, each of the paired second conveyer rollers being configured to rotate about a rotation axis extending along the moving direction,
   wherein the controller is configured to determine a position of a rear end of the recordable medium in the conveying direction based on the signal output from the sensor, and
   wherein, on condition that the rear end of the recordable medium is at a position downstream in the conveying direction from a nipping position between the paired first conveyer rollers, the controller is configured to determine the post-correction rotation amount.

4. The image recording apparatus according to claim 1, wherein the memory stores a lower-limit value, and
   wherein the controller is configured to, on condition that the correction value is smaller than the lower-limit value, determines the post-correction rotation amount based on the target rotation amount and an amount corresponding to the lower-limit value in place of the correction value.

* * * * *